(12) United States Patent
Lee

(10) Patent No.: US 7,758,757 B2
(45) Date of Patent: Jul. 20, 2010

(54) METHOD FOR REMOVING HYDRAZINE COMPOUNDS

(75) Inventor: Kiu-Seung Lee, Midlothian, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 367 days.

(21) Appl. No.: 11/975,417

(22) Filed: Oct. 19, 2007

(65) Prior Publication Data

US 2009/0101589 A1    Apr. 23, 2009

(51) Int. Cl.
C02F 1/28    (2006.01)

(52) U.S. Cl. ............... 210/691; 210/735; 210/737; 210/908

(58) Field of Classification Search ............ 210/690
See application file for complete search history.

(56) References Cited

U.S. PATENT DOCUMENTS

| | | | |
|---|---|---|---|
| 2,609,387 A | 9/1952 | Basdekis et al. | |
| 3,159,632 A | 12/1964 | Sargent | |
| 3,937,686 A | 2/1976 | Augstlams | |
| 4,056,469 A | 11/1977 | Eichenhofer et al. | |
| 4,067,854 A | 1/1978 | Fiorentino | |
| 4,380,615 A | 4/1983 | Sauerbrunn | |
| 4,532,318 A | 7/1985 | Abubakari et al. | |
| 4,804,527 A | 2/1989 | Tatarchuk et al. | |
| 4,902,544 A * | 2/1990 | Kim et al. .................. | 428/36.1 |
| 5,043,075 A | 8/1991 | Dietmar et al. | |
| 5,141,611 A * | 8/1992 | Ford ........................... | 568/717 |
| 5,354,945 A * | 10/1994 | Detering et al. ............. | 523/310 |
| 7,074,959 B2 | 7/2006 | Helvenston | |
| 7,098,301 B1 * | 8/2006 | Smith ...................... | 528/502 A |
| 7,105,633 B2 * | 9/2006 | Wang et al. ................. | 528/491 |

FOREIGN PATENT DOCUMENTS

| | | |
|---|---|---|
| EP | 0 149 792 | 7/1985 |
| GB | 1146291 | 3/1969 |
| JP | 58-177193 | 10/1983 |
| JP | 61-120691 | 6/1986 |
| WO | WO 03/000597 A1 | 1/2003 |

* cited by examiner

*Primary Examiner*—Peter A Hruskoci

(57) ABSTRACT

Disclosed are methods for removing hydrazine compounds from solutions. Solutions containing hydrazine compounds are contacted with crosslinked polyvinylpyrrolidone.

20 Claims, 5 Drawing Sheets

Poly(m-phenylene-1,3,4-oxadiazole)

Poly(p-phenylene-1,3,4-oxadiazole)

Poly(2,6-naphthalene-1,3,4-oxadiazole)

Poly(1,4'-biphenylene-1,3,4-oxadiazole)

Poly(4,4'-oxybisphenylene-1,3,4-oxadiazole)

Poly(4,4'-azobenzene-1,3,4-oxadiazole)

Poly(4,4'-stilbene-1,3,4-oxadiazole)

Poly(1,4-phenylenediacryl-1,3,4-oxadiazole)

| Time (Hrs.) @ 50°C | Hydrazine conc. (ppm) | (% Reduction) |
|---|---|---|
| 0 | 5 | 0 |
| 2 | 4 | 20 |
| 4 | 3.5 | 30 |
| 6 | 2.1 | 58 |
| 24 | 0.2 | 96 |
| 26 | 0.2 | 96 |
| | | |
| | | |

FIG. 2

| Time (Hrs.) @ 80°C | Hydrazine conc. (ppm) | (% Reduction) |
|---|---|---|
| 0 | 5 | 0 |
| 1 | 0.8 | 84 |
| 2 | 0.1 | 98 |
| 3 | 0 | 100 |

FIG. 5

METHOD FOR REMOVING HYDRAZINE COMPOUNDS

FIELD OF THE INVENTION

The field of the invention includes methods of removing hydrazine compounds from solution. The field of the invention also includes contacting solutions with crosslinked polyvinylpyrrolidone.

BACKGROUND OF THE INVENTION

Hydrazine compounds are useful for polymer synthesis because they are reactive and bifunctional. Hydrazine compounds are also useful for rocket fuels, and in many other chemical applications where they act as strong reducing agents. Hydrazine compounds are also very hazardous to the environment and to human health. Hydrazine compounds can cause irritation, organ and tissue damage, and death. Hydrazine compounds are also carcinogens.

During the production and processing of certain polymers, such as polyoxadiazole, hydrazine compounds may be present in solutions such as feed solutions, wash solutions, waste solutions, product solutions, and by-product solutions. These solutions may be generated in batches or continuously in process streams. Because of the known hazards of hydrazine compounds, it may be desired to remove hydrazine from these solutions.

Known methods for removing hydrazine compounds from solutions may rely on adding further substances such as hypochlorites or ozone in order to render the hydrazine compounds inert. Yet these further substances may also not be desired in solutions, or may be reactive. For example, these further substances may cause undesired reactions or may harm the desired polymer products. Other methods of decomposing hydrazine compounds may yield unwanted nitrogen gas.

Accordingly, there is a need to remove hydrazine compounds from solutions without dissolving any new compounds in solution or causing further chemical reactions in solution.

SUMMARY OF THE INVENTION

Methods for removing hydrazine compounds from solutions are described herein. Polyvinylpyrrolidone ("PVP") is a water-soluble polymer with a variety of industrial uses. PVP is particularly useful in the pharmaceutical and food and beverage industries, because it is safe for human consumption, and has no known toxicological effects. Crosslinked PVP ("PVPP") is a form of PVP wherein the polymer chains are interconnected by chemical bonds.

One aspect of PVPP is that it remains solid and will not redissolve in water. In the beverage industry, for example, PVPP can be added to a solution to facilitate coagulation of unwanted impurities. The solid material comprising PVPP and impurities can then be removed from the liquid phase by a method such as filtration. Because the PVPP remains solid throughout the process, no new chemicals are introduced into the solution.

Accordingly, one aspect of the present invention provides methods of contacting solutions containing less than about 10,000 ppm of hydrazine compounds with PVPP. As a result, the concentration of the hydrazine compounds in solution decreases. The PVPP is insoluble in the solution, and thus nothing new is dissolved in solution.

A further aspect of the present invention provides methods of removing the PVPP from the solution, for example by filtration, centrifugation, or sedimentation. As a result, the original solution is then free of PVPP, and hydrazine compounds are carried out with the PVPP.

The present invention is effective in solutions containing desired polymer compounds as well as water and hydrazine compounds. Because the PVPP is inert, hydrazine compounds are removed by the methods of the present invention without altering the desired polymer compounds.

A further aspect of the present invention provides methods for using PVPP to remove hydrazine compounds from solutions wherein the solutions are in process streams. In this regard, separation of PVPP from the solution could also be effected by passing the process stream containing the solution over a packed bed containing the PVPP. Thus, the methods of this invention can be used in a batch format, semi-batch format, or a continuous format.

The general description and the following detailed description are exemplary and explanatory only and are not restrictive of the invention, as defined in the appended claims. Other aspects of the present invention will be apparent to those skilled in the art in view of the detailed description of the invention as provided herein.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings:

FIG. 2 illustrates the decrease in concentration of hydrazine in solution over time at 50° C. after the addition of PVPP.

FIG. 5 illustrates the decrease in concentration of hydrazine in solution over time at 80° C. after the addition of PVPP.

DETAILED DESCRIPTION OF ILLUSTRATIVE EMBODIMENTS

Figure 1:
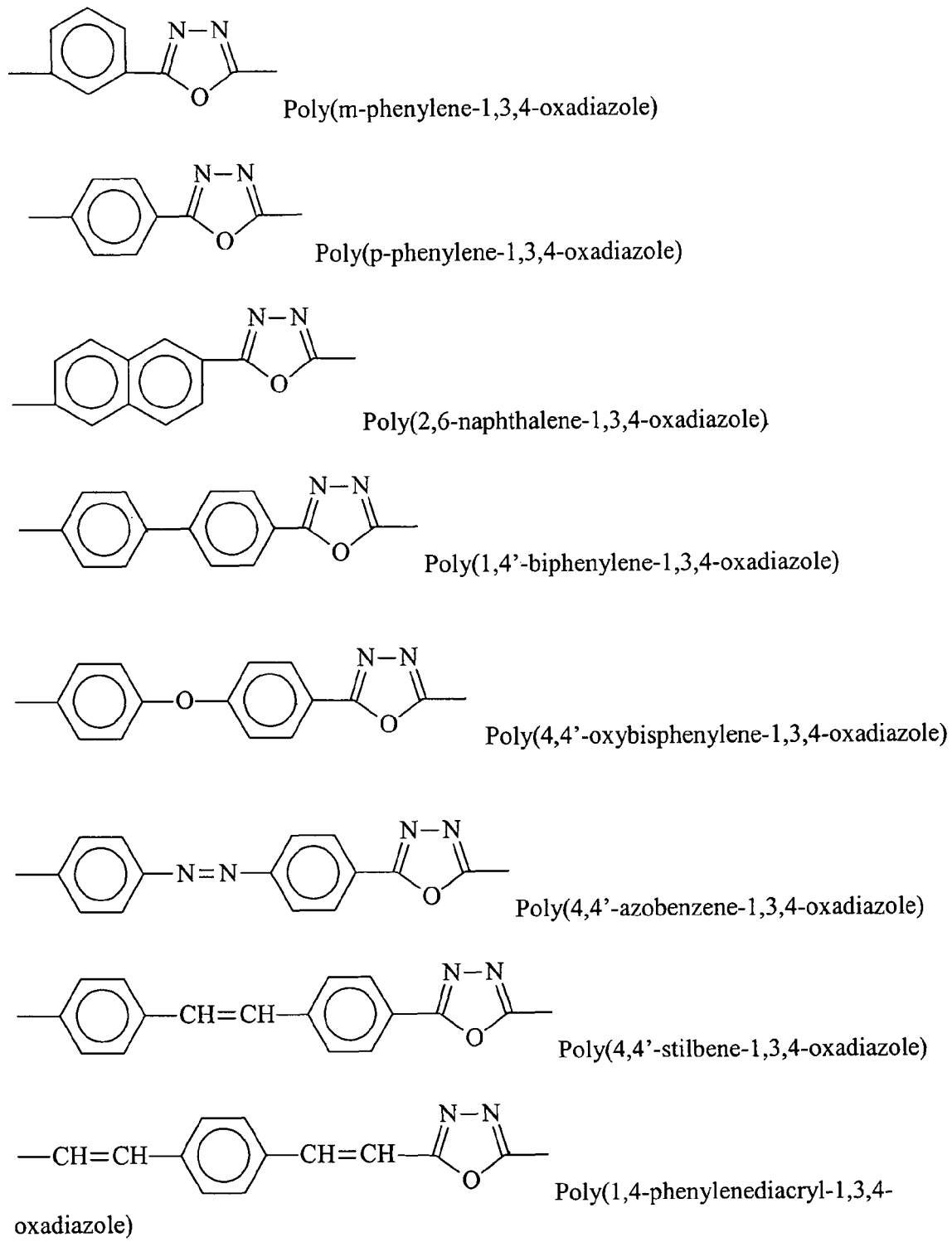
FIG. 1 illustrates a number of polymers that may be present in the solutions of the present invention.

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range.

Methods are provided for removing hydrazine compounds from solutions. This removal can be accomplished by contacting PVPP with a solution containing less than about 10,000 ppm of one or more hydrazine compounds. PVPP is preferred to PVP in the present invention because PVPP remains solid when exposed to water. This characteristic is a result of the crosslinking process.

Crosslinking can be accomplished by adding a number of crosslinker molecules to the PVP during polymerization. Crosslinker molecules generally have at least two reactive groups each. One class of effective crosslinker molecules is multifunctional acrylate molecules. Several subclasses of acrylate crosslinkers are difunctional acrylates, such as hexandioldiacrylate or hexandioldimethacrylate, trifunctional acrylates such as trimethanolpropane triacrylate, tetrafunctional acrylates, and pentafunctional acrylates. A further class of crosslinker molecules is difunctional vinyl ether compounds. Yet another class of crosslinker molecules is difunctional mercaptan compounds. A still further class of crosslinker molecules is difunctional acrylamide molecules.

Once the PVPP is contacted with the solution, the amount of free hydrazine compounds in solution is decreased. Then, the PVPP can be removed from the solution, leaving behind a solution substantially free of PVPP and having a reduced quantity of dissolved hydrazine compounds.

Removal of a solid, such as PVPP, from a solution, such as the solutions of these methods, can be accomplished in numerous ways. The PVPP can be removed by, for example, filtration, centrifugation, sedimentation, or any combination thereof.

The solutions of these methods may contain various compounds other than hydrazine compounds. For example, the methods of this invention are effective when applied to solutions of hydrazine in water. The methods of this invention are also effective when applied to solutions of polymers and hydrazine compounds in water. The methods of this invention are also effective when applied to solutions of polymers, monomers, and hydrazine compounds in water. In some embodiments of this invention, the polymers in solution are in a latex form.

In some embodiments of this invention, the hydrazine compound is hydrazine ($N_2H_4$), or a hydrazine salt such as hydrazine sulfate. In other embodiments, the hydrazine compound is monomethylhydrazine, or 1,1 dimethylhydrazine. In still further embodiments, the hydrazine compound is any compound with at least one hydrazine group.

In some embodiments of this invention, the solutions containing the hydrazine compounds may also contain polymer compounds. This may arise during the production or processing of polymers. In such situations, the methods of the present invention can remove hydrazine compounds without harming the polymers or otherwise impairing the solutions. Some illustrative examples of polymers that may be present in the solutions are polyoxadiazole, poly(m-phenylene-1,3,4-oxadiazole), poly(p-phenylene-1,3,4-oxadiazole), poly(2,6-naphthalene-1,3,4-oxadiazole), poly(1,4'-biphenylene-1,3,4-oxadiazole), poly(4,4'-oxybisphenylene-1,3,4-oxadiazole), poly(4,4'-azobenzene-1,3,4-oxadiazole), poly(4,4'-stilbene-1,3,4-oxadiazole), and poly(1,4-phenylenediacryl-1,3,4-oxadiazole). FIG. 1 illustrates a number of polymers that may be present in the solutions of the present invention.

Further methods of this invention include altering the temperature of the solution before, during, or after the process of removing hydrazine compounds. One example of this is where the solution is heated from at least about 25° C. to at most about 120° C. Different temperature ranges within this larger range may offer particular advantages, depending on the solution, hydrazine compounds, polymers, and other influential conditions.

Still further methods of this invention subject the solution to agitation before, during, or after the process of removing hydrazine compounds.

The solutions of these methods may also be present in process streams. Suitable process streams may be part of a continuous process, such as one that produces a monomer, polymer, or other compound of interest. The process streams may also be present only transiently, during one or more parts of a batch or semi-batch process. The methods of this invention that can be practiced on solutions generally can also be practiced on solutions in process streams.

For example, in the methods of this invention that include removing the PVPP from the solution, this removal could be accomplished where the solution is in a process stream. The removal could be accomplished by filtration, sedimentation, or any combination thereof. Furthermore, the removal could also be accomplished by passing the process stream through a packed bed containing the PVPP.

In embodiments where the solution is in a process stream, the solution may also contain various compounds other than hydrazine compounds. This includes all of the aforementioned examples such as solutions of hydrazine in water, solutions of polymers and hydrazine compounds in water, and solutions of solutions of polymers, monomers, and hydrazine compounds in water. This also includes embodiments where the polymers in solution are in a latex form.

The solutions in process streams could contain any of the aforementioned hydrazine compounds, such as hydrazine, hydrazine salts, monomethylhydrazine, or 1,1 dimethylhydrazine, or any compound with at least one hydrazine group.

The solutions in process streams that contain polymers could contain any of the previously mentioned polymers, such as polyoxadiazole, poly(m-phenylene-1,3,4-oxadiazole), poly(p-phenylene-1,3,4-oxadiazole), poly(2,6-naphthalene-1,3,4-oxadiazole), poly(1,4'-biphenylene-1,3,4-oxadiazole), poly(4,4'-oxybisphenylene-1,3,4-oxadiazole), poly(4,4'-azobenzene-1,3,4-oxadiazole), poly(4,4'-stilbene-1,3,4-adiazole), and poly(1,4-phenylenediacryl-1,3,4-oxadiazole).

Like solutions generally, process streams containing solutions can also be heated. Accordingly, further methods of this invention include altering the temperature of the solution in a process stream before, during, or after the process of removing hydrazine compounds. One example of this is where the process stream is heated from at least about 25° C. to at most about 120° C. Different temperature ranges within this larger range may offer particular advantages, depending on the solution, hydrazine compounds, polymers, and other influential conditions.

Still further methods of this invention subject the solution in process stream to agitation before, during, or after the process of removing hydrazine compounds.

EXAMPLES AND OTHER ILLUSTRATIVE EMBODIMENTS

In one example, reduction in hydrazine concentration in solution from 5 ppm to 0.2 ppm at 50° C. has been demonstrated. A 5 ppm stock solution of hydrazine sulfate was prepared by adding 0.0203 g of solid hydrazine sulfate to 1000 g of deionized water. The hydrazine sulfate was mixed until totally dissolved. To this 5 ppm stock solution, 2 g of POLYCLAR® Super R was added and mixed at 50° C. POLYCLAR® Super R is the trade name of a form of PVPP sold by ISP (International Speciality Products) Beverage 1361 Alps Road, Wayne, N.J. 07470, USA. At specific time points an aliquot of this solution was removed from this treated solution and filtered to remove the crosslinked polyvinylpyrrolidone. Then, the solution was analyzed for hydrazine content. Hydrazine analysis was accomplished through the use of a colormetric analytical procedure taught by T. A. LaRue of the National Research Council of Canada, Prarie Regional Laboratory, Saskatoon, Saskatchewan, Canada. The chemistry, reagents, and procedure for this analysis are outlined in the paper "Selective spot test for hydrazine," Talanta, 1967, Vol. 14, pp. 1344 to 1346, Pergamon Press Ltd. This paper is also issued as N.R.C. No. 9756. The detection limit for this analytical test is 0.25 ppm.

Figure 3:
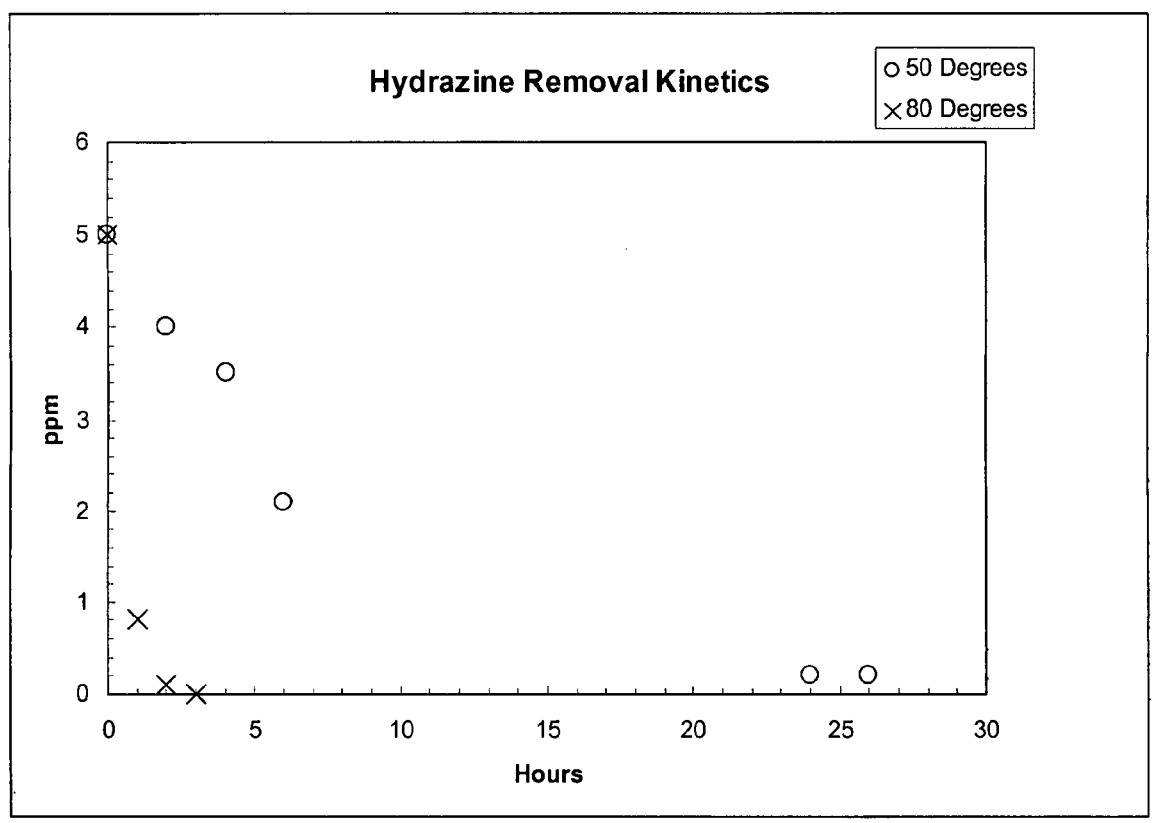
FIG. 3 illustrates the decrease in concentration of hydrazine in solution upon addition of PVPP at both 50° C. and 80° C.
Figure 4:
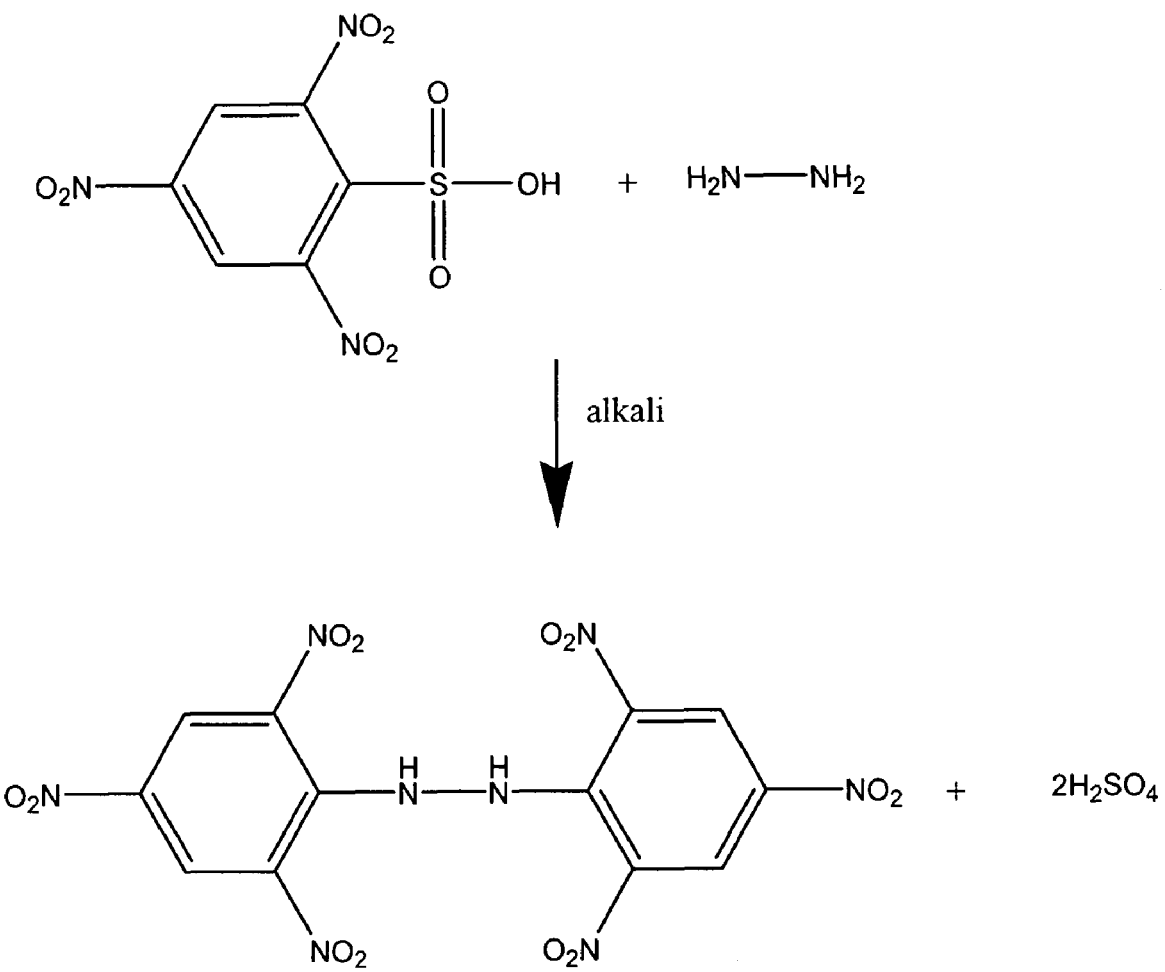
FIG. 4 illustrates the reaction between trinitrobenzene sulfonic acid and hydrazine to form hexanitrobenzene, used to detect the concentration of hydrazine in solution.

FIG. 2 illustrates the decrease in concentration of hydrazine in solution over time at 50° C. after the addition of PVPP. FIG. 3 also illustrates the decrease in concentration of hydrazine in solution over time at 50° C. after the addition of PVPP. FIG. 4 illustrates the reaction between trinitrobenzene sulfonic acid and hydrazine to form hexanitrobenzene, used to detect the concentration of hydrazine in solution.

In a second example, reduction in hydrazine concentration in solution from 5 ppm to below detectable limits at 80° C. has been demonstrated. A 5 ppm stock solution of hydrazine sulfate was prepared by adding 0.0203 g of solid hydrazine sulfate to 1000 g of deionized water. The hydrazine sulfate was mixed until totally dissolved. To this 5 ppm stock solution, 2 g of POLYCLAR® Super R was added and mixed at 80° C. POLYCLAR® Super R is the trade name of a form of PVPP sold by ISP (International Speciality Products) Beverage 1361 Alps Road, Wayne, N.J. 07470, USA. At specific time points an aliquot of this solution was removed from this treated solution and filtered to remove the crosslinked polyvinylpyrrolidone. Then, the solution was analyzed for hydrazine content. Hydrazine analysis was accomplished through the use of a colormetric analytical procedure taught by T. A. LaRue of the National Research Council of Canada, Prarie Regional Laboratory, Saskatoon, Saskatchewan, Canada. The chemistry, reagents, and procedure for this analysis are outlined in the paper "Selective spot test for hydrazine," Talanta, 1967, Vol. 14, pp. 1344 to 1346, Pergamon Press Ltd. This paper is also issued as N.R.C. No. 9756. The detection limit for this analytical test is 0.25 ppm.

FIG. 5 illustrates the decrease in concentration of hydrazine in solution over time at 80° C. after the addition of PVPP. FIG. 3 also illustrates the decrease in concentration of hydrazine in solution over time at 80° C. after the addition of PVPP.

What is claimed:

1. A method for removing a hydrazine compound from a solution comprising (a) contacting crosslinked polyvinylpyrrolidone with a solution containing less than about 10,000 ppm of a hydrazine compound and (b) removing the hydrazine compound from the solution.

2. The method of claim 1, further comprising the step of removing the crosslinked polyvinylpyrrolidone from the solution.

3. The method of claim 2, wherein the crosslinked polyvinylpyrrolidone is removed by filtration, centrifugation, sedimentation, or any combination thereof.

4. The method of claim 3, wherein the solution comprises water and a hydrazine compound.

5. The method of claim 3, wherein the solution comprises water, a hydrazine compound, and a polymer.

6. The method of claim 5, wherein the hydrazine compounds comprise one or more of the following: hydrazine, monomethylhydrazine, and 1,1 dimethylhydrazine.

7. The method of claim 5, wherein the polymer is in a latex form.

8. The method of claim 5, wherein the polymer comprises one or more of the following: polyoxadiazole, poly(m-phenylene-1,3,4-oxadiazole), poly(p-phenylene-1,3,4-oxadiazole), poly(2,6-naphthalene-1,3,4-oxadiazole), poly(1,4'-biphenylene-1,3,4-oxadiazole), poly(4,4'-oxybisphenylene-1,3,4-oxadiazole), poly(4,4'-azobenzene-1,3,4-oxadiazole), poly(4,4'-stilbene-1,3,4-oxadiazole), and poly(1,4-phenylenediacryl-1,3,4-oxadiazole).

9. The method of claim 3, wherein the solution is heated from at least about 25° C. to at most about 120° C.

10. The method of claim 3, wherein the solution is subjected to agitation.

11. The method of claim 1, wherein the solution is in a process stream.

12. The method of claim 11, further comprising the step of removing the crosslinked polyvinylpyrrolidone from the process stream.

13. The method of claim 12, wherein the crosslinked polyvinylpyrrolidone is removed by filtration, centrifugation, sedimentation, or any combination thereof.

14. The method of claim 12 wherein the solution comprises water and hydrazine.

15. The method of claim 12, wherein the solution comprises water, hydrazine, and a polymer.

16. The method of claim 15, wherein the hydrazine compounds comprise one or more of the following: hydrazine, monomethylhydrazine, and 1,1 dimethylhydrazine.

17. The method of claim 15, wherein the polymer is in a latex form.

18. The method of claim 15, wherein the polymer comprises one or more of the following: polyoxadiazole poly(m-phenylene-1,3,4-oxadiazole), poly(p-phenylene-1,3,4-oxadiazole), poly(2,6-naphthalene-1,3,4-oxadiazole), poly(1,4'-biphenylene-1,3,4-oxadiazole), poly(4,4'-oxybisphenylene-1,3,4-oxadiazole), poly(4,4'-azobenzene-1,3,4-oxadiazole), poly(4,4'-stilbene-1,3,4-oxadiazole), and poly(1,4-phenylenediacryl-1,3,4-oxadiazole).

19. The method of claim 12, wherein the solution is heated from at least about 25° C. to at most about 120° C.

20. The method of claim 11, wherein the solution is contacted with the crosslinked polyvinylpyrrolidone by passing the process stream through a packed bed containing the crosslinked polyvinylpyrrolidone.

* * * * *